(12) United States Patent
Lin et al.

(10) Patent No.: US 11,775,751 B2
(45) Date of Patent: Oct. 3, 2023

(54) METHOD AND SYSTEM FOR EXTRACTING VALUABLE WORDS AND FORMING VALUABLE WORD NET

(71) Applicant: Awoo Intelligence, Inc., Taipei (TW)

(72) Inventors: Kuo-Ming Lin, Taipei (TW); Szu-Wu Lin, Taipei (TW)

(73) Assignee: AWOO INTELLIGENCE, INC., Taipei (TW)

( * ) Notice: Subject to any disclaimer, the term of this patent is extended or adjusted under 35 U.S.C. 154(b) by 317 days.

(21) Appl. No.: 17/328,086

(22) Filed: May 24, 2021

(65) Prior Publication Data

US 2022/0253600 A1 Aug. 11, 2022

(30) Foreign Application Priority Data

Feb. 9, 2021 (TW) ................................. 110105017

(51) Int. Cl.
*G06F 40/205* (2020.01)
*G06F 40/279* (2020.01)

(52) U.S. Cl.
CPC .......... *G06F 40/205* (2020.01); *G06F 40/279* (2020.01)

(58) Field of Classification Search
CPC .............................. G06F 40/205; G06F 40/279
See application file for complete search history.

(56) References Cited

U.S. PATENT DOCUMENTS

| | | | | |
|---|---|---|---|---|
| 2014/0122493 | A1* | 5/2014 | Sifry | G06F 16/285 707/738 |
| 2015/0341771 | A1* | 11/2015 | Ma | H04W 8/005 707/722 |
| 2020/0118035 | A1* | 4/2020 | Asawa | G06F 16/22 |

FOREIGN PATENT DOCUMENTS

| | | | | |
|---|---|---|---|---|
| CN | 106055545 A | * | 10/2016 | ........... G06F 16/313 |
| CN | 106055545 A | | 10/2016 | |
| CN | 107423444 A | * | 12/2017 | ......... G06F 16/3334 |
| CN | 107423444 A | | 12/2017 | |
| CN | 111125484 A | * | 5/2020 | |
| CN | 111125484 A | | 5/2020 | |
| CN | 111488736 A | * | 8/2020 | |
| CN | 111488736 A | | 8/2020 | |
| JP | 2019003406 A | * | 1/2019 | |
| JP | 2019003406 A | | 1/2019 | |
| JP | 2020181463 A | | 11/2020 | |

* cited by examiner

*Primary Examiner* — Anne L Thomas-Homescu (74) *Attorney, Agent, or Firm* — Muncy, Geissler, Olds & Lowe, P.C.

(57) ABSTRACT

Method and system for extracting valuable words and forming a valuable word net, wherein a server is employed to collect contents of articles from internet sources, EDM texts (email direct marketing), product descriptions and other texts, and extract valuable words by machine learning. Each valuable word performs connection weight based on the number of times the text has been read, the number of times the text has been clicked, the number of times the text has been cited, the correlation of external sites, the conversion of expert knowledge, the probability space, the Shannon entropy, the spatial distribution and other values and their conversion by machine learning; then the linked valuable words are integrated to form a valuable word net. When the valuable words are needed to be used, the valuable words and the valuable word net can be retrieved from the database for subsequent applications.

12 Claims, 14 Drawing Sheets

METHOD AND SYSTEM FOR EXTRACTING VALUABLE WORDS AND FORMING VALUABLE WORD NET

BACKGROUND OF INVENTION

(1) Field of the Present Disclosure

The present disclosure relates to a method and a system for extracting valuable words and forming a valuable word net, and more particularly to a method/system that uses word analysis and machine learning, especially word extraction, to links a large number of words to form a valuable word net.

(2) Brief Description of Related Art

Currently, the online world is filled with a lot of information, articles, essays, etc. However, it is difficult for the network users, the network data processing units, or the network advertising providers to accurately obtain useful information from the large amount thereof, or to apply it. As a result, how to quickly and accurately obtain useful information from the internet world has become a very important topic in the network development. Therefore, many conventional solutions have been disclosed, such as "method, device, computer equipment and storage media for self-learning word segmentation" from CN111488736A, and "methods, systems and electronic equipment for finding talk topics" from CN111125484A. The technical feature of the above-mentioned solutions is to focus on the hot words searched by the user when the keyword search is employed, or to perform word frequency statistics on the historical text to determine the hot words. Another conventional solutions are shown as follows:
(1) CN106055545A "System and tool text-mining"
(2) CN107423444A "Method and system for extracting hot phrases"
(3) US20150341771A1 "Hotspot aggregation method and device"
(4) US20140122493A1 "Ecosystem method of aggregation and search and related techniques"
(5) JPA 2020181463 "Treasure keyword search system"
(6) JPA 2019003406 "Information gathering equipment, information gathering method, and information gathering program"

As shown above, there are many methods for extracting effective ("valuable", or "essential") words or sentences from the text. Especially, how to define "keyword" has been a topic discussed by the above-mentioned solutions, such as: the frequency of keywords, the method of word hyphenation analysis, the frequency of word use, etc. However, if one only uses machine learning to extract keywords, it may miss non-keywords but useful words. In the process of extracting valuable words, it is easy to be deliberately manipulated to cause distortion of the judgment results of the system, such as: buzzwords, puns, mixed use of Chinese and English, etc. Moreover, simply extracting valuable words in the text, if it fails to be more systematically sorted, will easily make the keywords unable to be effectively combined with other keywords when they are subsequently applied.

In summary, the present keyword collection and use do have the above-mentioned drawbacks. Accordingly, how to avoid the drawbacks of keyword collection and improve the convenience and effectiveness of its application are problems to be resolved.

SUMMARY OF INVENTION

It is a primary object of the present disclosure to provide a method/system for extracting valuable words and forming a valuable word net for autonomously collecting various types of text on the Internet, extracting valuable words through machine learning, and then linking the valuable words to form a "valuable word net"

According to the present disclosure, a server collects in a proactive or autonomous manner all kinds of texts, such as articles from internet sources, EDM texts (email direct marketing), product descriptions, etc. Meanwhile, the server is trained to learn a large amount of texts by machine learning, while valuable keywords in each text are extracted. The valuable words are not limited to keywords. The server can extract and store "valuable words" with application value according to various situations (such as buzzwords, puns, Chinese-English mixed words, etc.). When the extraction of valuable words is completed, the server can train on the valuable words again. Based on the number of times the text has been read, the number of times the text has been clicked, the number of times the text has been cited, the correlation of external sites, the conversion of expert knowledge, the probability space, the Shannon entropy, the spatial distribution and other values and their conversion, the valuable words are weighted to be linked with other valuable words. The link based on the weighted value (=weighted link) can show the correlation between various valuable words, and will be adjusted differently according to the time and regions. Accordingly, the server further integrates multiple groups of linked valuable words to form a dense "valuable word net". When users need to use valuable words and to retrieve relevant valuable words from their database via the server, the valuable word net will be retrieved at the same time. In addition, if the valuable words belong to different fields or different aspects, the server can also perform a self-copying learning function. In this way, the weight of the valuable words in the valuable word net can be directly adjusted according to different fields. Therefore, there is no need to perform the weighted link between the valuable words again so that the users can easily carry out various subsequent applications and processing.

DETAILED DESCRIPTION OF PREFERRED EMBODIMENTS

Figure 1:
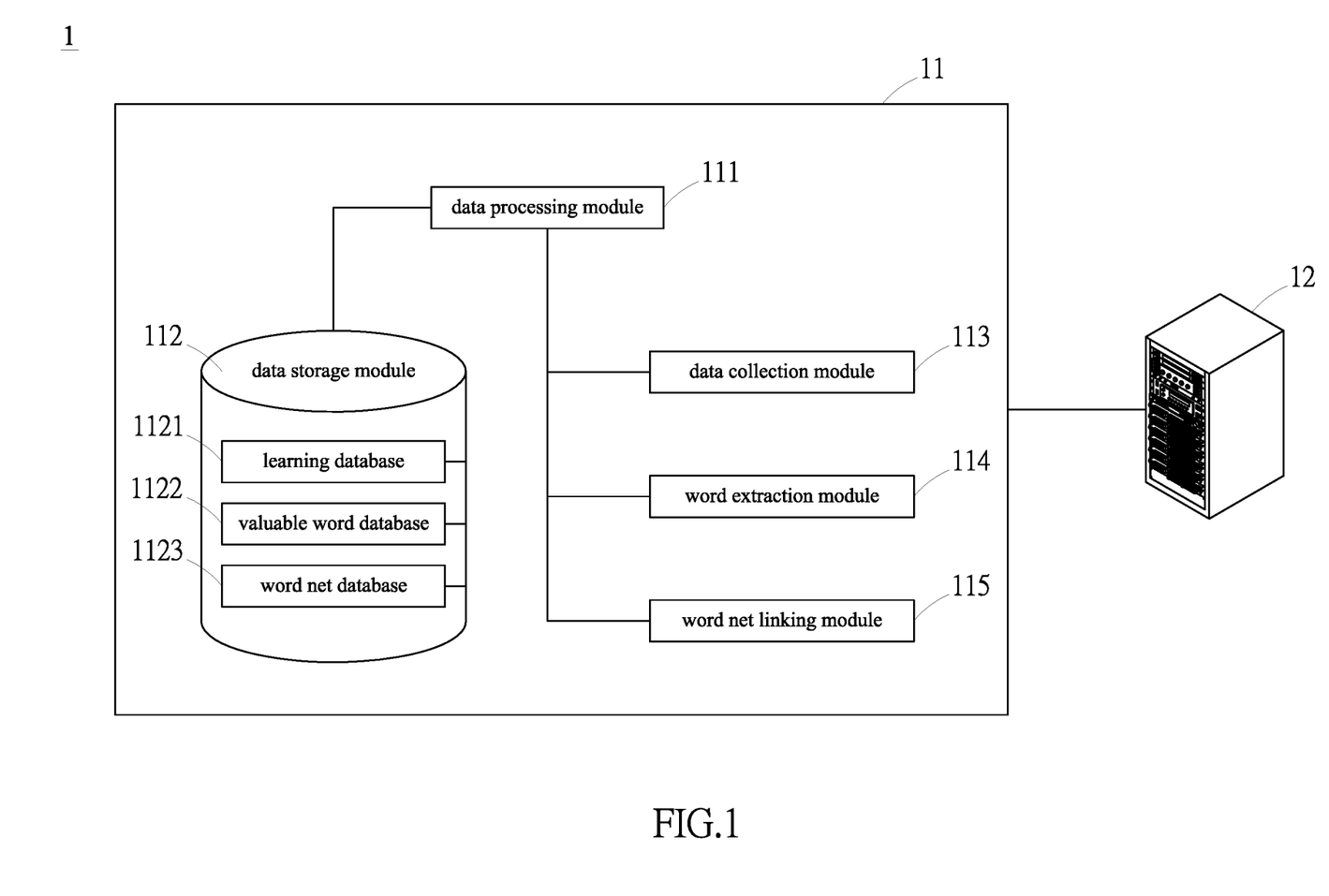
FIG. 1 is a schematic drawing of the composition of the present disclosure.

Referring to FIG. 1, a system for extracting valuable words and forming a valuable word net 1 includes a server 11 and a third-party search system 12.

The server 11 is connected to the third-party search system 12. The server 11 can obtain the required learning and training samples through the third-party search system 12, and build a model based on the learned and trained samples. The model is built by training in the way of machine learning to learn the text, to extract the valuable word in the text, and then to link a number of the extracted valuable word to form a valuable word net.

The third-party search system 12 can be a search engine database, an advertisement database, or a text database. Any system that enables the server 11 to obtain the required learning and training samples is applicable.

The server 11 mainly includes a data processing module 111 which is respectively connected to a data storage module 112, a data collection module 113, a word extraction module 114, and a word net linking module 115. The data processing module 111 is employed to operate the server 11 and to drive the above-mentioned modules in operation. The data processing module 111, for example a central processing unit (CPU), fulfills functions such as logical operations, temporary storage of operation results, and storage of the position of execution instructions.

The data storage module 112 can store electronic data, such as SSD (Solid State Disk or Solid State Drive), HDD (Hard Disk Drive,), SRAM (Static Random Access Memory), DRAM (Random Access Memory), etc. The data storage module 112 mainly includes a learning database 1121, a valuable word database 1122, and a word net database 1123. The learning database 1121 mainly stores text information and text-related information collected by the data collection module 113. The valuable word database 1122 mainly stores the valuable word extracted by the word extraction module 114. The word net database 1123 mainly stores the word net linked and integrated by the word net linking module 115.

The data collection module 113 mainly obtains the text information and the text-related information through the third-party search system 12. The data collection module 113 mainly uses browser search, data retrieval, web crawler and other methods or a combination thereof to obtain the text information and the text-related information. The text information can generally refer to texts such as articles from internet sources, email marketing texts, product descriptions, public documents, short texts, or a combination thereof. The text information includes not only a single natural language or a single natural language family, but also multiple natural languages or mixed natural languages. The text-related information refers to any one or a combination of related data of the text or words in the text, such as the number of times the text has been used, the number of times the text has been linked, the number of times the text has been cited, the number of times the text has been clicked, the number of times the text has been read, the number of times the words in the text have been occurring, used, read, and clicked, and the frequency of common words, and various values such as the correlation of external sites, the conversion of expert knowledge, the probability space, the Shannon entropy, the spatial distribution as well as the weighted value between the various values after conversion and other valuable word. The correlation of the external station refers to the analysis and calculation of the data crawled from the outside, and the calculation of the scores for the text of the data crawled from the outside based on the related words. The above-mentioned conversion of expert knowledge refers to the conversion of the existing expert rules in the company into a quantitative value, such as Explicit Knowledge.

The word extraction module 114 can train and learn the text information and extract the valuable word therefrom. The training/learning (machine learning) mainly refers to an unsupervised learning, a self-supervised learning or a heuristic algorithms, which can be performed by themselves. The word extraction module 114 uses the text information and the text-related information independently collected by the data collection module 113 or stored in the learning database 1121 as training data. Meanwhile, the valuable words are extracted and stored in the valuable word database 1122 or transmitted to the subsequent word net linking module 115. The valuable word extracted by the word extraction module 114 are not limited to a single language or language family. The same or similar words in different languages or language families can also be extracted. The word net linking module 115 can train and learn the text-related information with respect to the valuable word sent by the word extraction module 114 or stored in the valuable word database 1122, and assign the valuable word and another valuable word to create links based on the weighting of words. The training/learning (machine learning) mainly refers to an unsupervised learning, a self-supervised learning or a heuristic algorithms, which can be performed by themselves, but not limited thereto. The valuable word and several other valuable word can have their own weighting of words to create links. Another valuable word can be linked with subsequent valuable word. Therefore, the word net linking module 115 can integrate a great number of valuable words into a valuable word net which is stored in the word net database 1123.

Figure 2:
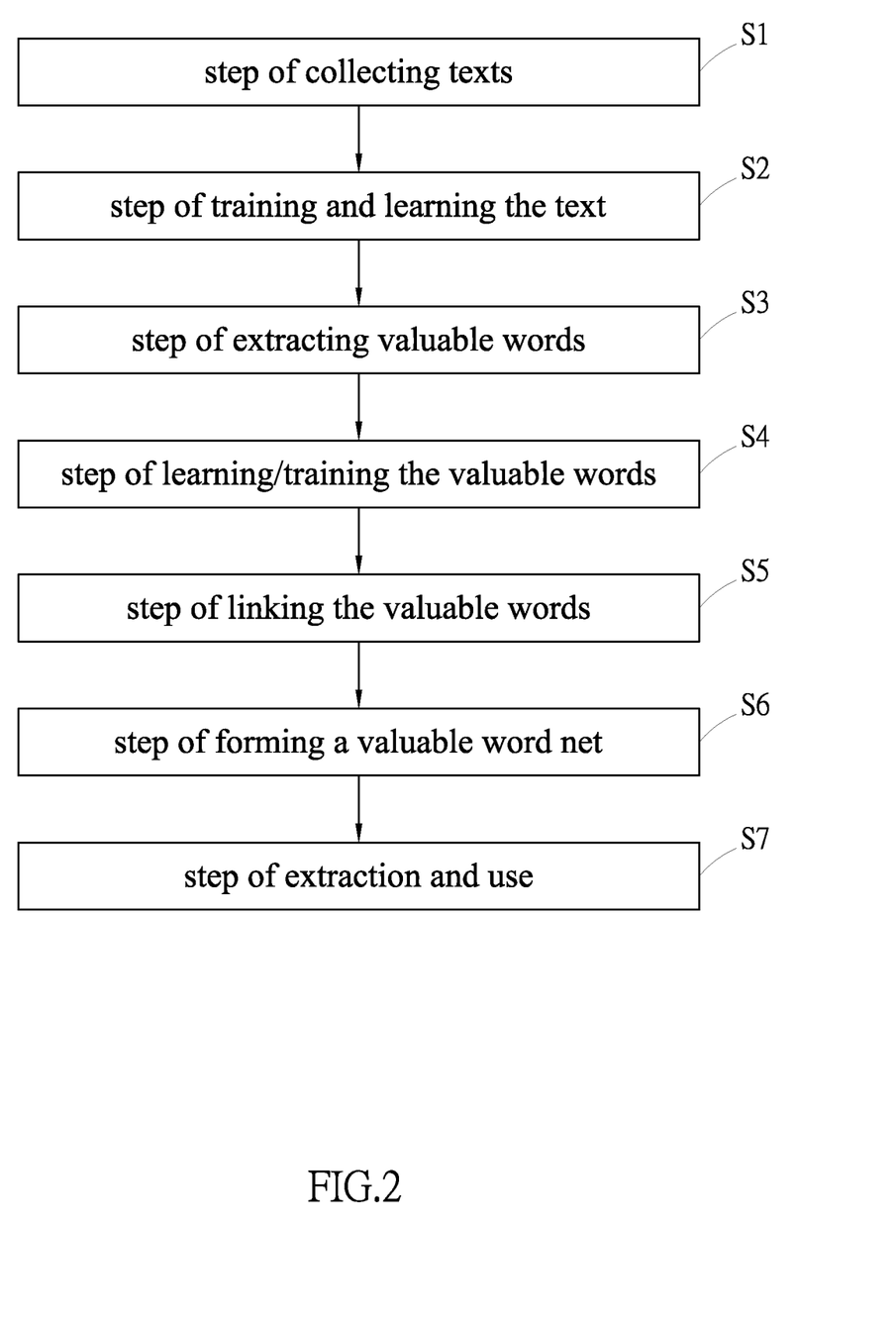
FIG. 2 is a flow chart of the present disclosure.
Figure 3:
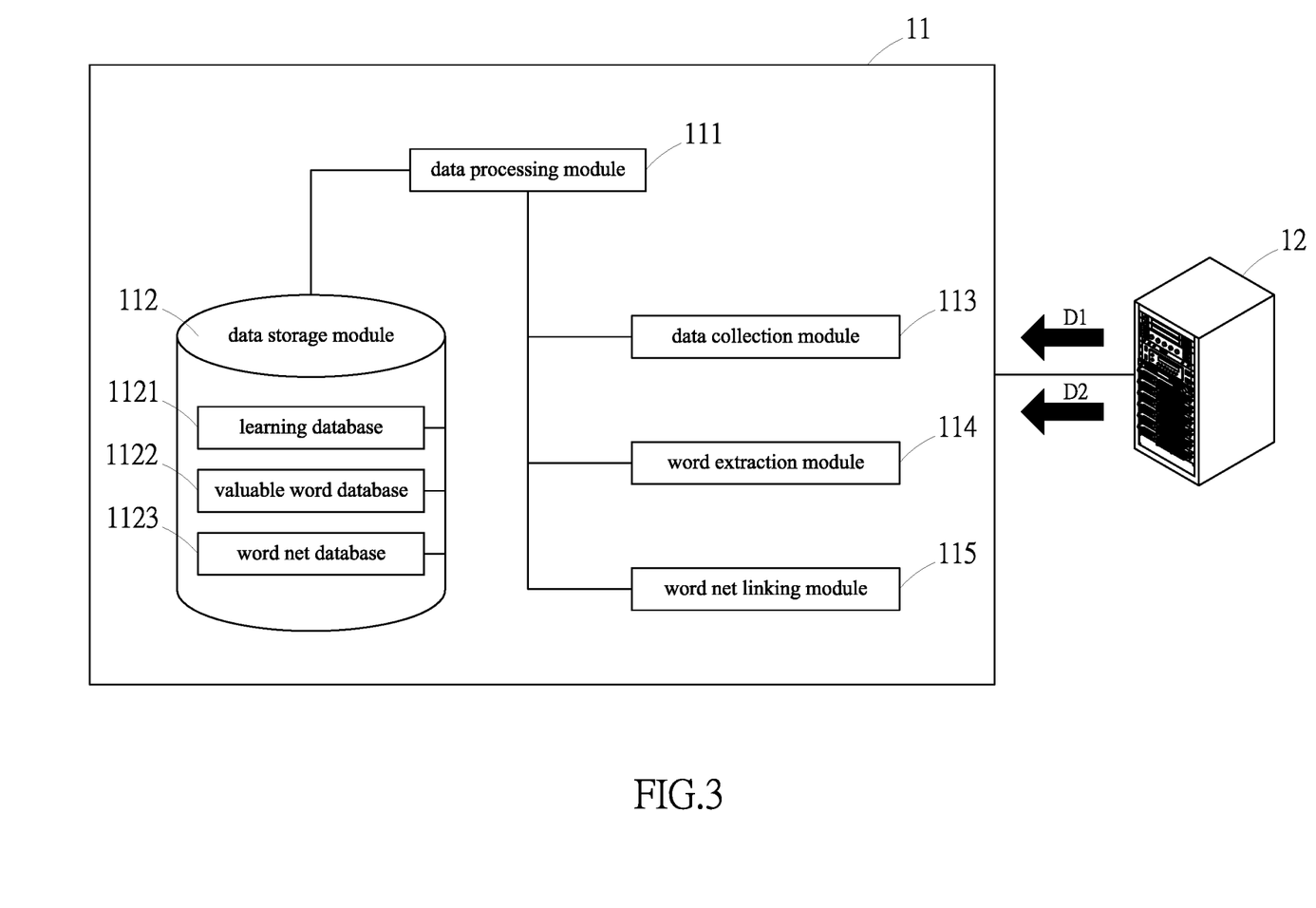
FIG. 3 is a schematic drawing I of the implementation of the present disclosure.

As illustrated in FIG. 2 together with FIG. 1, the steps of the present disclosure are shown as follows:

(1) Step S1 of Collecting Texts:

As shown in FIG. 3, the data collection module 113 of the server 11 is connected to the third-party search system 12 via internet, and collects a text information D1 and a text-related information D2 related to the text information D1 through the third-party search system 12. The text information D1 and the text related information D2 are stored in a learning database 1121, or directly sent to a subsequent word extraction module 114. The text information D1 refers to texts such as articles from internet sources, email marketing texts, product descriptions, public documents, short texts, or a combination thereof. The text-related information D2 refers to any one or a combination of related data of the text or words in the text, such as the number of times the text has been used, the number of times the text has been linked, the number of times the text has been cited, the number of times the text has been clicked, the number of times the text has been read, the number of times the words in the text have been occurring, used, read, and clicked, and the frequency of common words, etc., but is not limited thereto. In addition, the server 11 mainly obtains the text information D1 and the text related information D2 through the third-party search system 12 by use of browser search, data retrieval, web crawler, etc. or a combination thereof.

Figure 4:
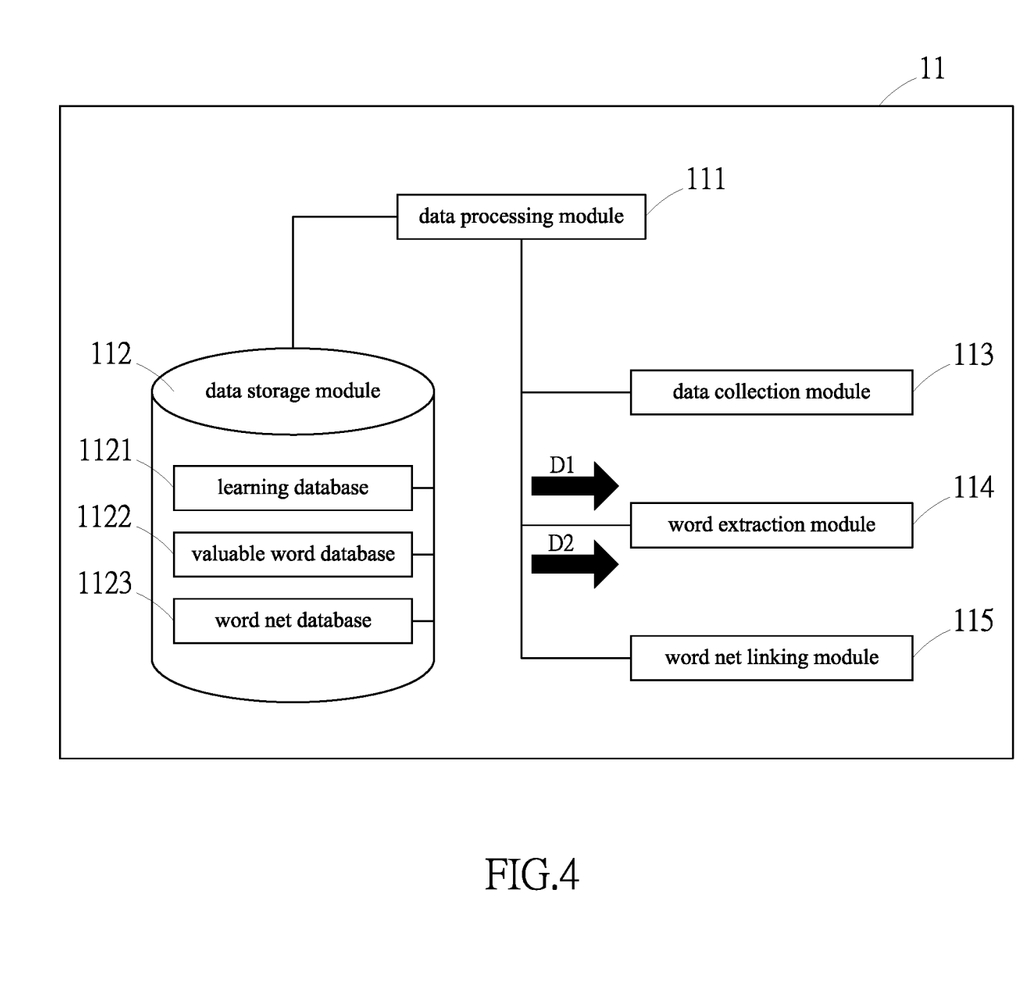
FIG. 4 is a schematic drawing II of the implementation of the present disclosure.

(2) Step S2 of Training and Learning the Texts:

Following the above-mentioned step S1 and referring to FIG. 4, the word extraction module 114 makes use of the text information D1 and the text-related information D2 as a first training data to perform a first machine learning. The first machine learning mainly refers to an unsupervised learning, a self-supervised learning or a heuristic algorithms and other machine learning methods that can be performed by themselves. The text information D1 and text-related information D2 trained by the word extraction module 114 can also be stored in the learning database 1121 of the data storage module 112 by the data collection module 113 in advance. When the text information D1 is sufficient, training and learning can be carried out in a fixed period, so that real-time updates can be performed over time due to the difference in the amount of stored data. In this way, the results have different aspects and are close to the actual results.

Figure 5:
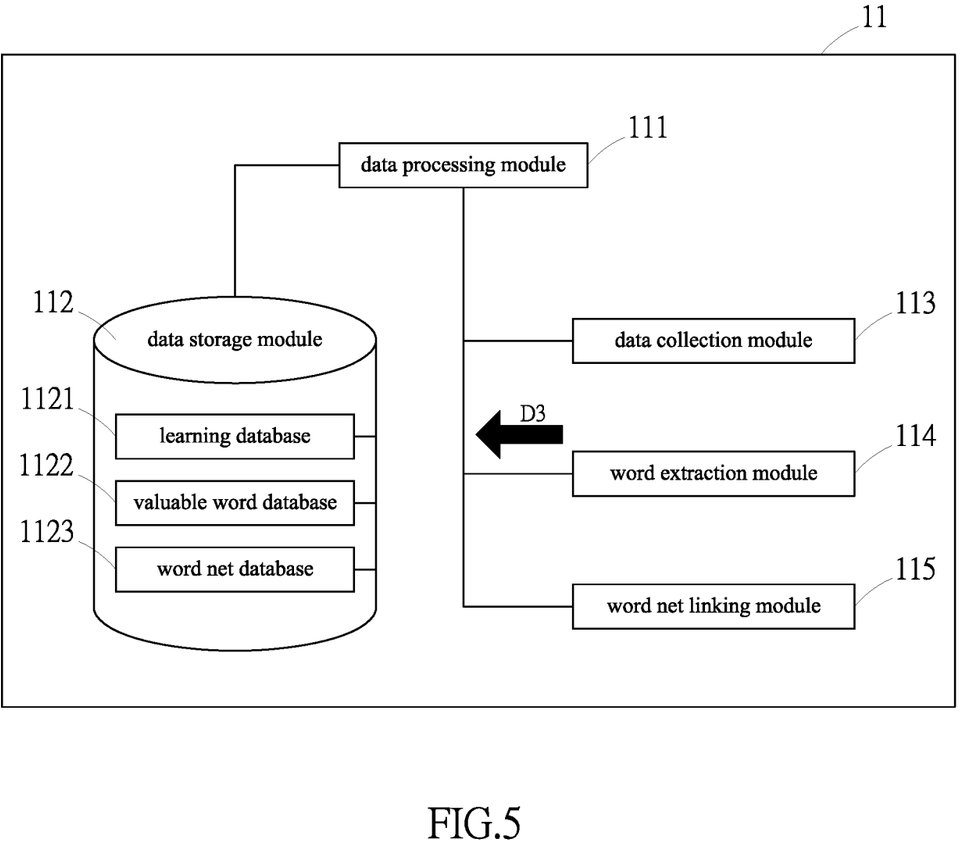
FIG. 5 is a schematic drawing III of the implementation of the present disclosure.
Figure 6:
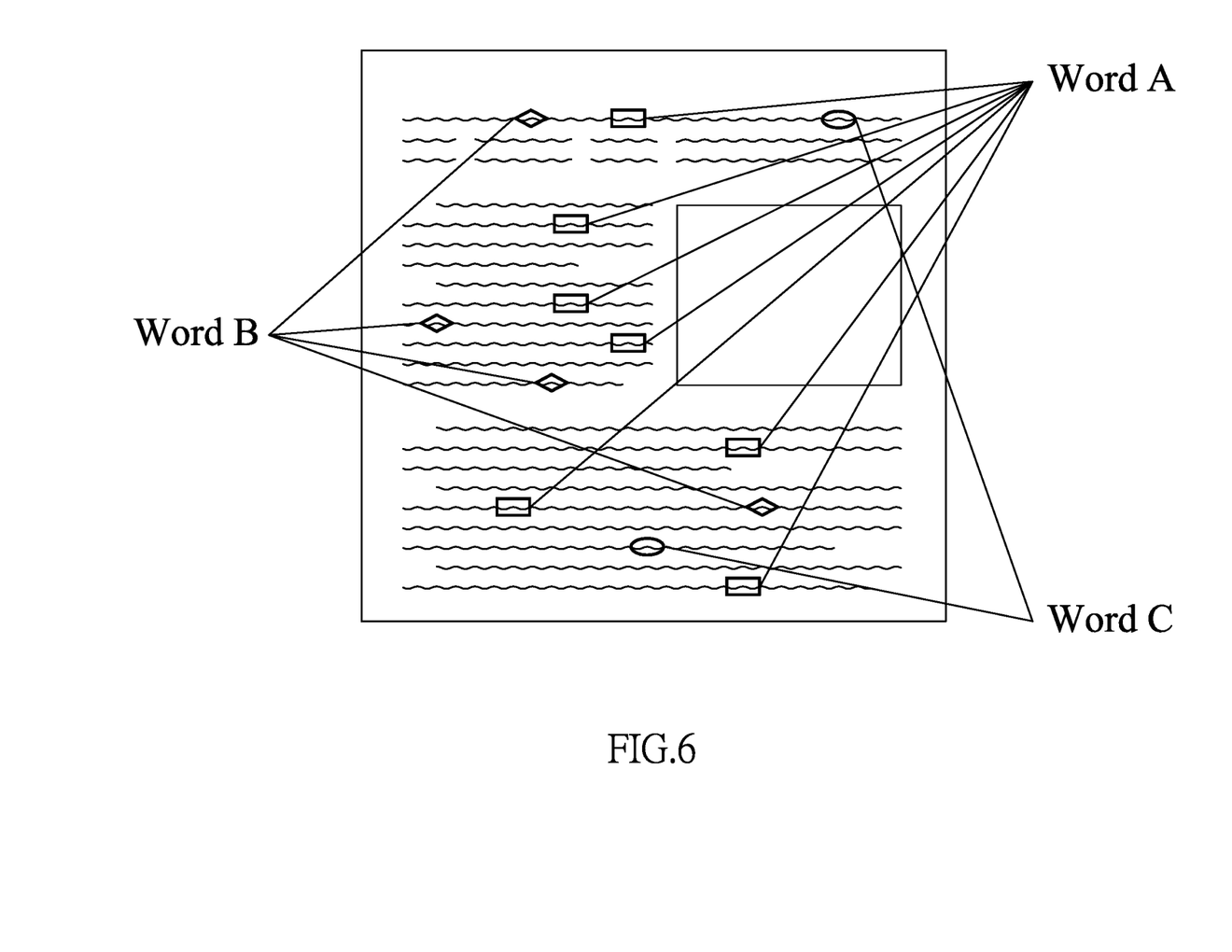
FIG. 6 is a schematic drawing IV of the implementation of the present disclosure.

(3) Step S3 of Extracting Valuable Words:

Following the above-mentioned steps and referring to FIGS. 5 and 6, the word extraction module 114 extracts a valuable word D3 from the text information D1 collected by the data collection module 113 based on a first machine learning result after the completion of the step of training and learning the texts. The extracted valuable word D3 is stored in the valuable word database 1122, or the valuable word D3 is forwarded to the subsequent word net linking module 115. The word extraction module 114 uses the text information D1 and the text-related information D2 including the number of times the text has been used, the number of times the text has been linked, the number of times the text has been cited, the number of times the text has been clicked, the number of times the text has been read, the number of times the words in the text have been occurring, used, read, and clicked, and the frequency of common words, etc. as the basis for extracting the valuable word D3. For example, the word extraction module 114 extracts a word A "(mask)" from the text information D1 as valuable word based on the first machine learning result when the word A "(mask)" appears in 7,000 times in the 10,000 training data and reaches the requirement of the number (70,000/100,000) of times the word has been clicked/read. In this case, word B "(hospital)" and word C "(epidemic)" will be extracted as valuable word D3. The above-mentioned example is only a simple example, not limited thereto.

Figure 7:
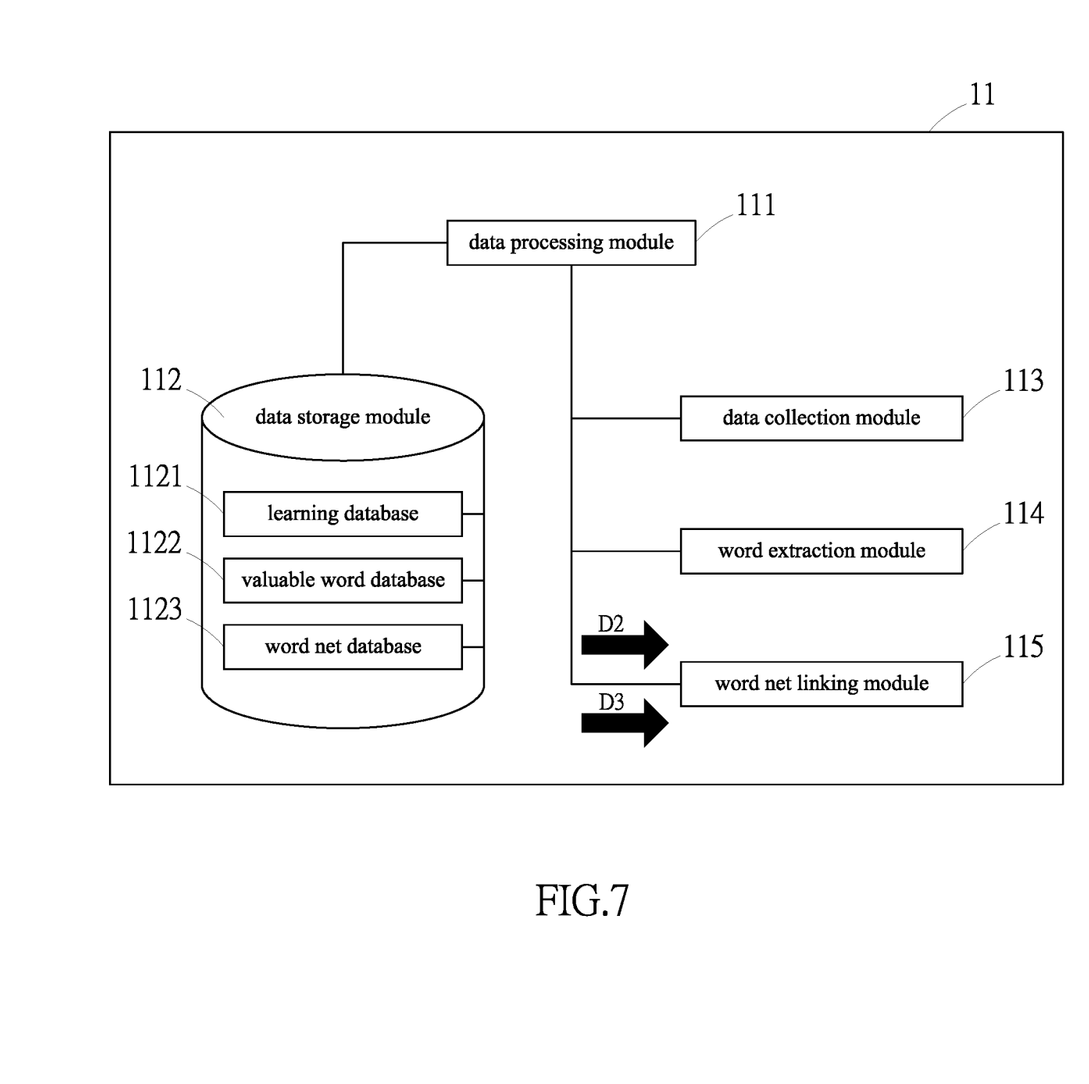
FIG. 7 is a schematic drawing V of the implementation of the present disclosure.

(4) Step S4 of Learning/Training the Valuable Words:

As shown in FIG. 7, the word net linking module 115 of the server 11 can use the valuable word D3 and the text-related information D2 as a second training data, and perform a second machine learning. The second machine learning mainly refers to an unsupervised learning, a self-supervised learning or a heuristic algorithms that can be performed by themselves. The valuable word D3 can be extracted by the word extraction module 114 and stored by the word net linking module 115 in the valuable word database 1122 first. When the valuable word D3 are sufficient, training and learning can be carried out so that the real-time updates can be performed as time goes by and the amount of stored data increases. In this way, the results have different aspects and are close to the actual results.

Figure 8:
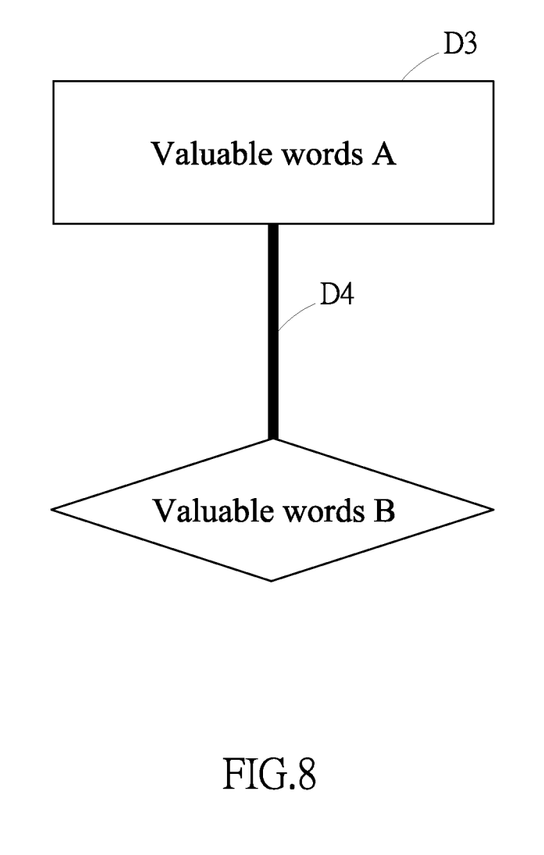
FIG. 8 is a schematic drawing VI of the implementation of the present disclosure.
Figure 9:
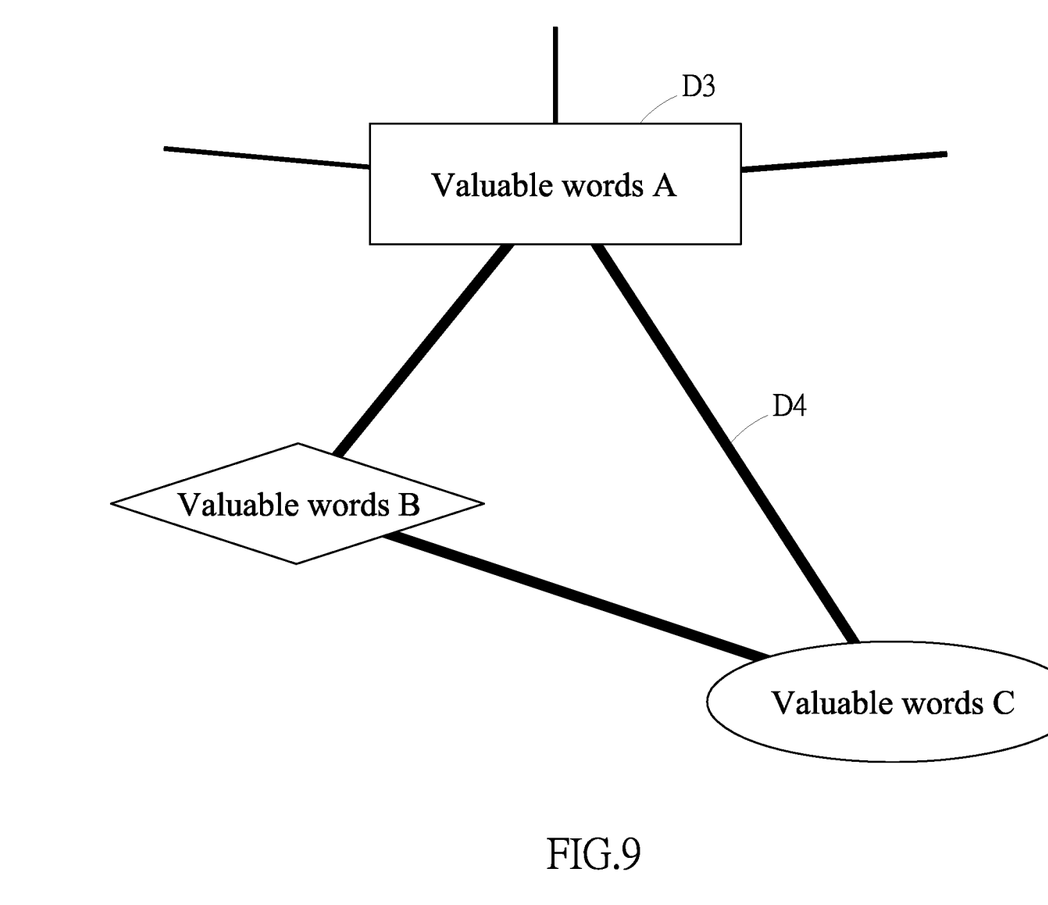
FIG. 9 is a schematic drawing VII of the implementation of the present disclosure.

(5) Step S5 of Linking the Valuable Words:

As shown in FIGS. 8 and 9, after completing the second machine learning, the word net linking module 115 generates a word weight D4 based on a second machine learning result, and employs the word weight D4 to link the valuable word D3 with another valuable word D31. The word weight D4 can be regarded as the correlation between the valuable word D3 and the valuable word D31 which can be based on the text-related information and measured by any one or a combination of related data of the words in the text, such as the number of times the text has been used, the number of times the text has been linked, the number of times the text has been cited, the number of times the text has been clicked, the number of times the text has been read, the number of times the words in the text have been occurring, used, read, and clicked, and the frequency of common words, the frequency of training use, the number of occurrences, the number of searches, the number of times and various values such as the correlation of external sites, the conversion of expert knowledge, the probability space, the Shannon entropy and the spatial distribution, and should not be limited thereto. The value of the word weight D4 is given by the word net linking module 115 after the training is completed. It may be adjusted according to different time, space, and field. For example, based on the second machine learning result, such as the number of times a valuable word A "(mask)" and another valuable word B "(hospital)" appear, are used or searched in online news, the word net linking module 115 will create a degree (0.8) of correlation between the valuable word A "(mask)" and another valuable word B "(hospital)". The above-mentioned example is just a simple example. The invention should not be limited thereto. In addition, the valuable word D3 can not only be linked to another valuable word D31, but can also be linked to countless other valuable words (D32, D33 . . . ) according to the word weight D4. For example, the valuable word A "(mask)" can not only be linked to the valuable word B "(hospital)" based on the degree (0.8) of correlation, but can also be linked to another valuable word C "(life)" based on the degree (0.5) of correlation. The above-mentioned example is just a simple example. The invention should not be limited thereto.

Figure 10:
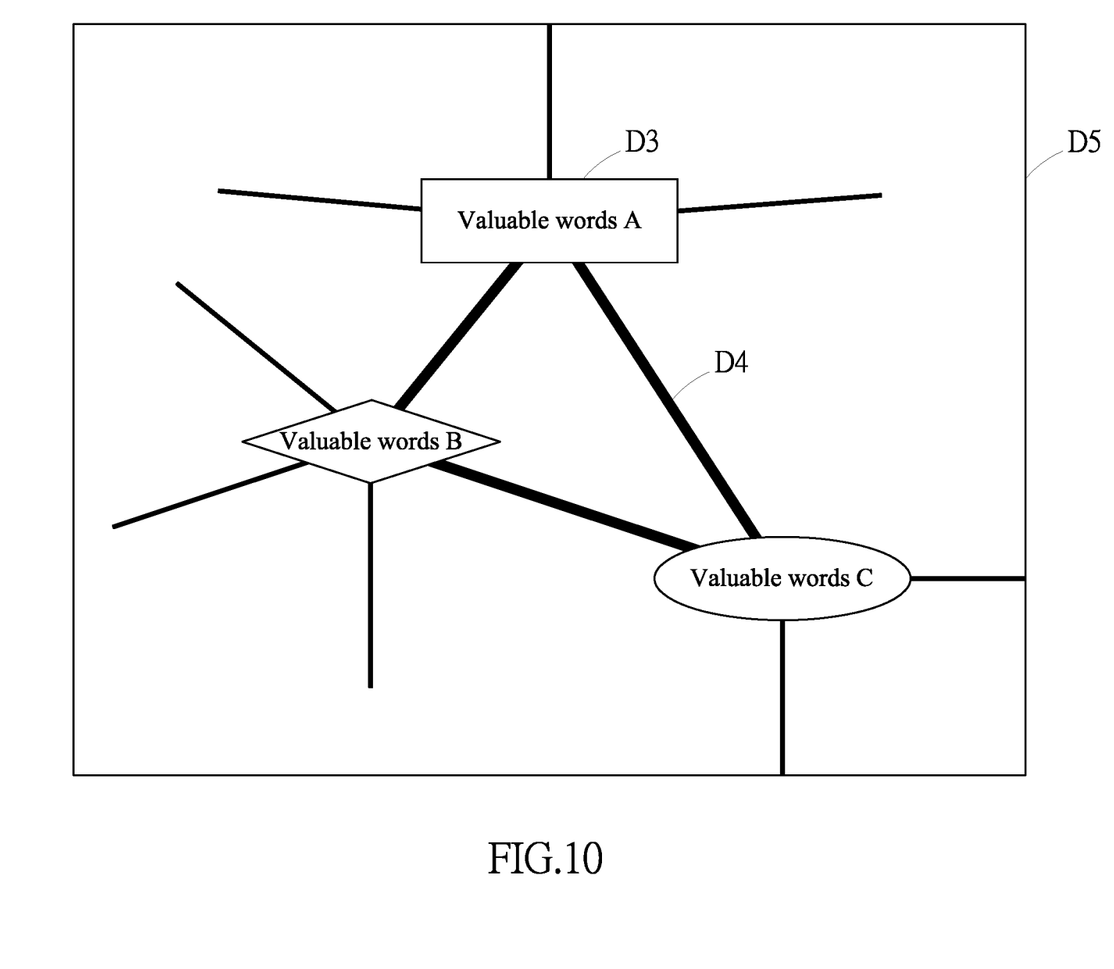
FIG. 10 is a schematic drawing VIII of the implementation of the present disclosure.
Figure 11:
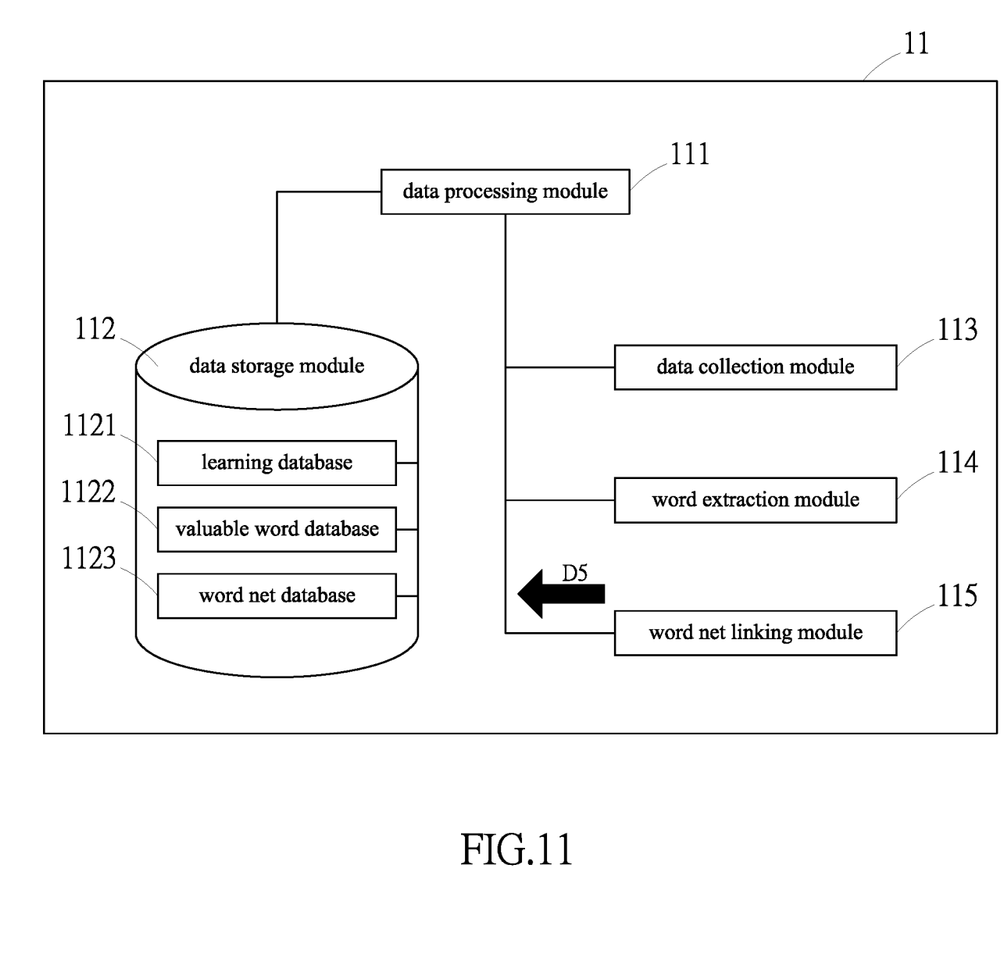
FIG. 11 is a schematic drawing VIIII of the implementation of the present disclosure.

(6) Step S6 of Forming the Valuable Word Net:

Following the step S5 of linking the valuable words, as shown FIGS. 10 and 11, the word net linking module 115 can link multiple groups of valuable words D3, D31, D32 . . . based on the word weight D4 to form the valuable word net D5. The valuable word net D5 is stored in the word net database 1123.

Figure 12:
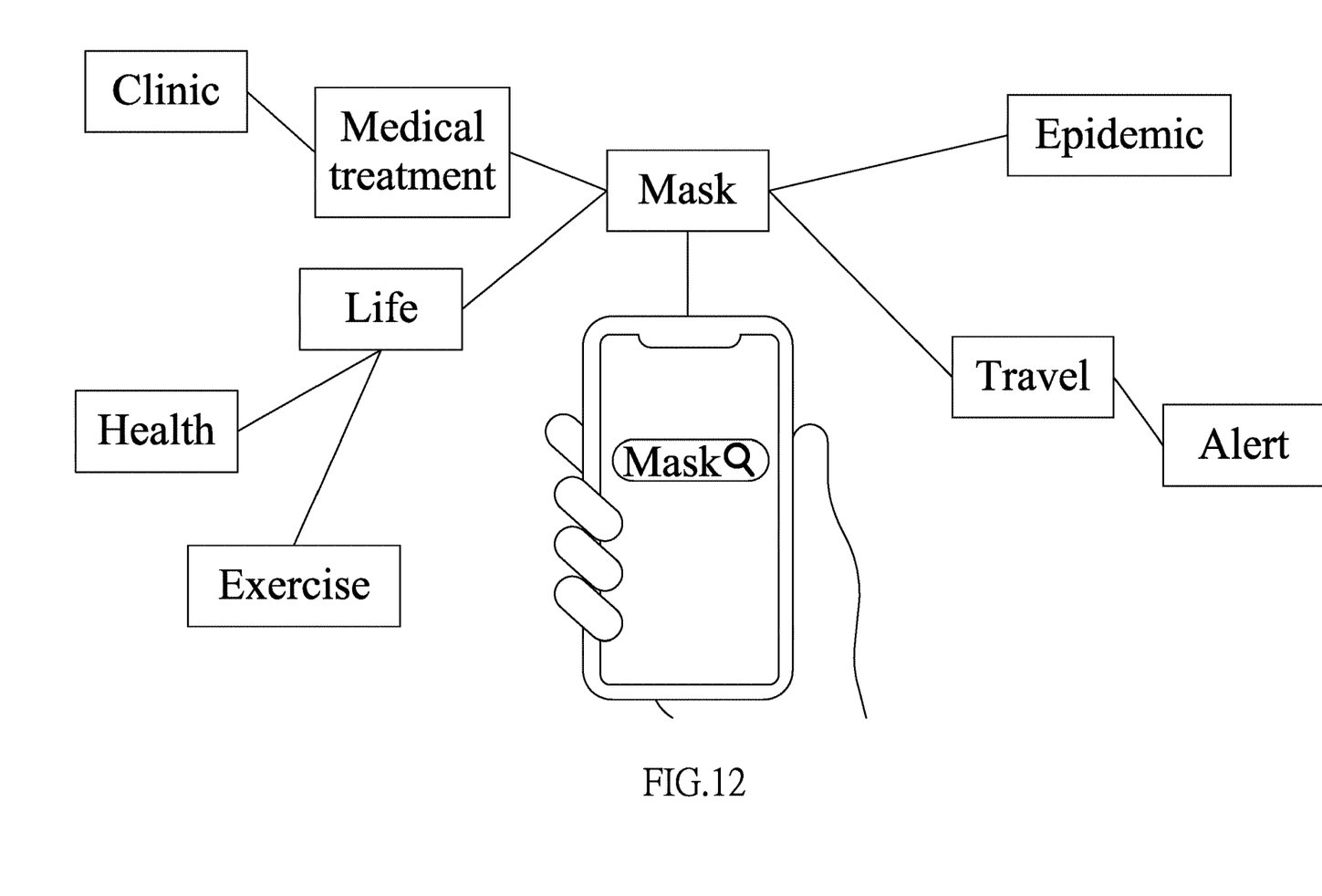
FIG. 12 is a schematic drawing of another embodiment of the present disclosure.

As shown in FIG. 12, the step S6 of forming the valuable word net can be followed by a step S7 of extraction and use. When a user needs to use the valuable word D3, he can use his user information device to extract the valuable word D3 from the server 11 for use. Since the valuable word D3 has been linked to multiple groups of other valuable words D31, D32 . . . to form the valuable word net D5, the user information device can not only receive the extracted valuable word D3, but also extract the remaining valuable words D3. For example: the user uses his computer or mobile information device to input and search for the word "mask" through the server 11. The server 11 can extract the remaining words linked with the word "mask" he searched for (such as "hospital" with a correlation of 0.8, "life" with a correlation of 0.5, "travel" with a correlation of 0.3, etc. stored in the server 11 and correlated with respect to the valuable word "mask"). Meanwhile, the server 11 may further extract the words linked to "hospital", "life", "travel", etc. from the valuable word net D5. The above-mentioned example is just a simple example. The invention should not be limited thereto.

Figure 13:
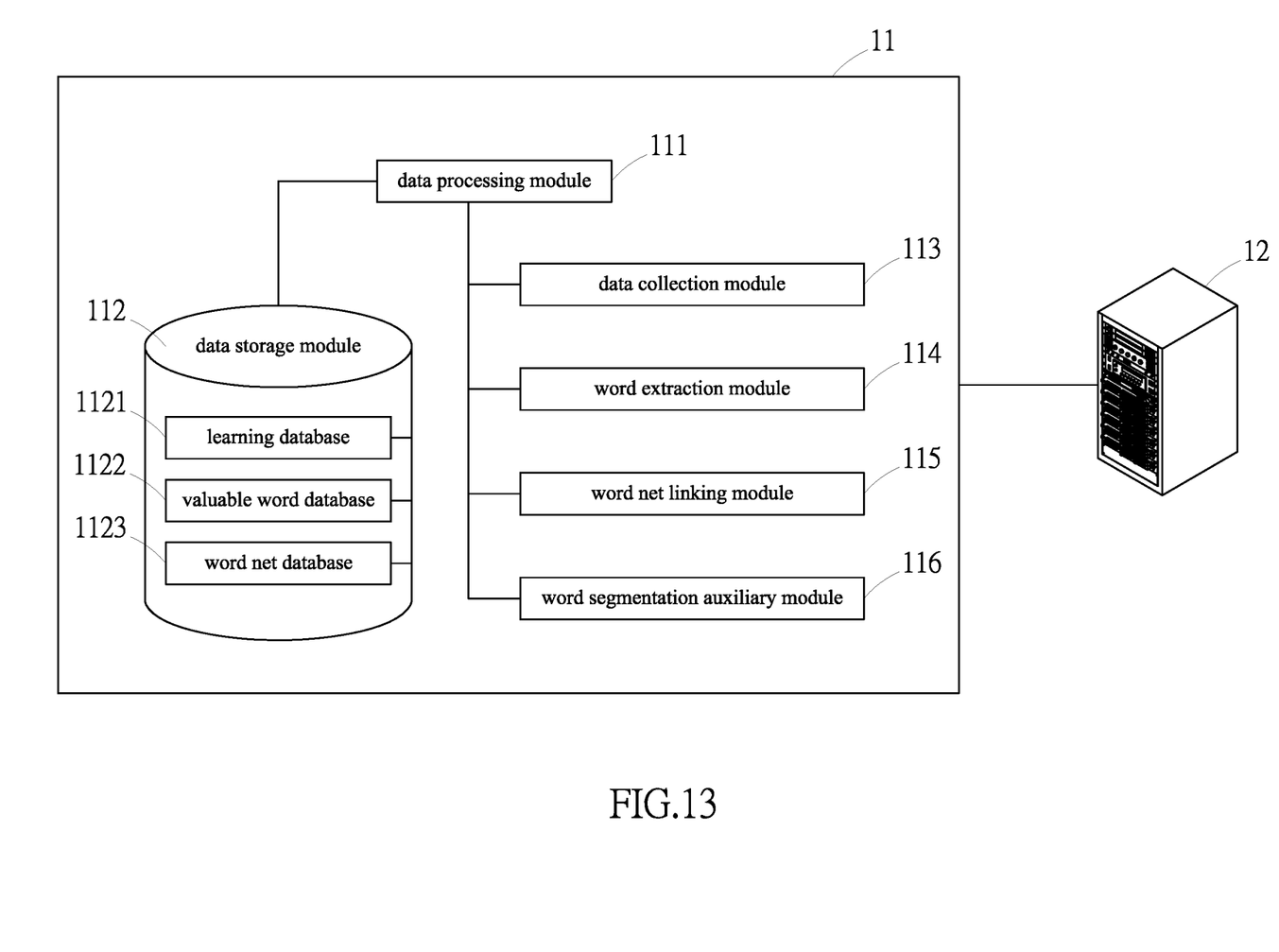
FIG. 13 is a schematic drawing of a further embodiment of the present disclosure.

As shown in FIG. 13, the data processing module 111 of the server 11 is further linked to a word segmentation auxiliary module 116. The word segmentation auxiliary module 116 can assist the word extraction module 114, and carry out a word segmentation action to assist the word extraction module 114 to learn and extract the valuable words D3. The word segmentation action is mainly based on nouns, adjectives, adverbs, subjects and other parts of the natural language to perform word segmentation. The word segmentation action is mainly done for language families without natural word segmentation, such as Chinese, Japanese and other language families. For example: The word extraction module 114 learns and extracts the valuable words D3 of "Today participate in the Taipei International Furniture Fair", and the word segmentation auxiliary module 116 can break it into "Today", "Participate", "Taipei", "International", and "Furniture Show", so that the word extraction module 114 can perform subsequent learning and extraction of valuable words D3. The above-mentioned example is just a simple example. The invention should not be limited thereto.

Figure 14:
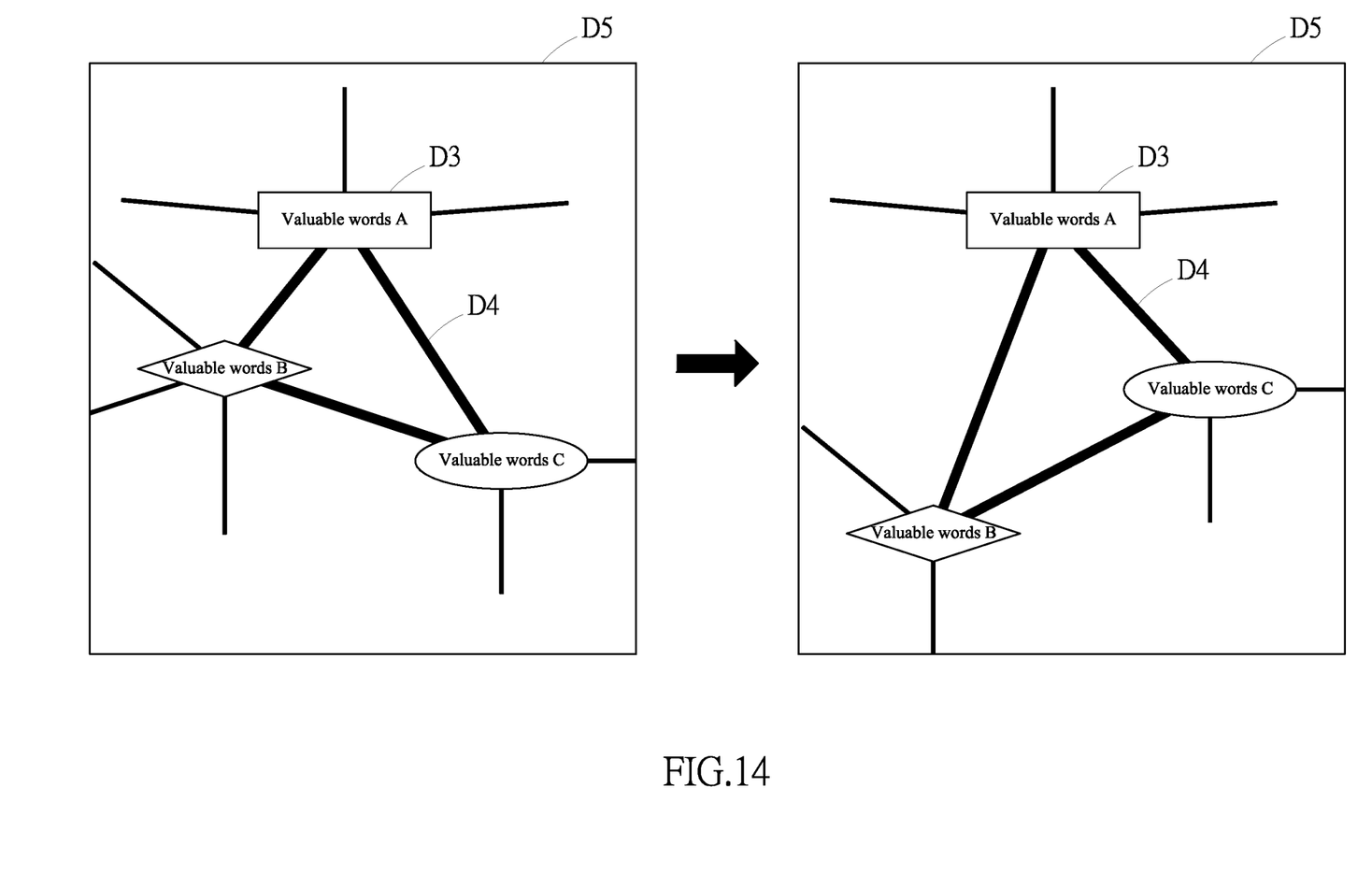
FIG. 14 is a schematic drawing of still another embodiment of the present disclosure.

As shown in FIG. 14, the word net linking module 115 includes a self-copying learning function. The word net link module 115 integrates the valuable word D3 into the word net D5, and can copy the word weight D4 between the valuable words D3 of the previous valuable word net D5 according to the previously integrated valuable word net D5 and apply it to the new valuable word net D5. Due to the different training fields, durations, and number of training samples for the valuable words D3, the previous valuable word net D5 can be used to quickly adjust the word weight D4 to form another valuable word net D5. For example: the valuable word A "mask" is previously linked to the valuable word B (hospital)" with a correlation of 0.8 and linked to the valuable word C "life" with a correlation of 0.5. However, due to the different training time and due to the occurrence of large-scale influenza incidents, masks and life are mentioned a lot in the texts of the year. Since the use of the valuable word A "mask" in the text searched by the server 11 is different in the medical field and the catering field, the word net link module 115 can use the past valuable word net D5 in such a manner that the valuable word A "mask" is linked to the valuable word B (hospital) with a correlation of 0.3 and linked to the valuable word C "life" with a correlation of 0.9. As a result, The word net linking module 115 does not need to judge again whether the valuable word A "mask" is linked to the valuable word B (hospital)", valuable word C "life", etc. The above-mentioned example is just a simple example. The invention should not be limited thereto.

In summary, the method/system for extracting valuable words and forming a valuable word net is based on a system collecting a large number of texts, and extracting the valuable words by machine learning, and then linking the valuable words into a valuable word net for the subsequent use. Accordingly, the purpose of the method and the system for collecting text independently, extracting valuable words through machine learning, and linking the valuable words into the valuable word net can be indeed achieved.

REFERENCE SIGN 1 system for extracting valuable words and forming a valuable word net
11 server
12 third-party search system
111 data processing module
112 data storage module
1121 learning database
1122 valuable word database
1123 word net database
113 data collection module
114 word extraction module
115 word net linking module
116 word segmentation auxiliary module
D1 text information
D2 text-related information
D3 valuable word
D4 word weight
D5 valuable word net
S1 step of collecting texts
S2 step of training and learning the text
S3 step of extracting valuable words
S4 step of learning/training the valuable words
S5 step of linking the valuable words
S6 step of forming a valuable word net
S7 step of extraction and use

What is claimed is:

1. A method for extracting valuable words and forming a valuable word net, comprising following steps:
    collecting texts, wherein a server is connected to third-party search system via internet, and independently collects one or more text information and text-related information related to the text information through the third-party search system;
    training and learning the texts, wherein the server continuously collects and transmits the text information and the text-related information to a word extraction module of the server, and the word extraction module uses the text information and the text-related information as the first training data to perform a first machine learning;
    extracting valuable words, wherein, after the word extraction module completes the first machine learning, the word extraction module extracts one or more valuable words from the text information based on a first machine learning result, and stores the valuable word in the server;
    learning/training the valuable words, wherein a word net linking module of the server stores one or more of the valuable words and the text-related information as a second training data for a second machine learning;
    linking the valuable words, wherein, after the word net linking module completes the second machine learning, the valuable word is linked to another valuable word or a plurality of the valuable words with a word weight based on a second machine learning result; and
    forming a valuable word net, wherein the word net linking module integrates one or more groups of the valuable words linked based on the word weight into the valuable word net, and stores the valuable word net in the server.

2. The method for extracting valuable words and forming a valuable word net as claimed in claim 1, wherein the text information comprises articles from internet sources, email marketing texts, product descriptions, public documents, short texts, or a combination thereof.

3. The method for extracting valuable words and forming a valuable word net as claimed in claim 1, wherein the text-related information comprises a number of times the text has been used, a number of times the text has been linked, a number of times the text has been cited, a number of times the text has been clicked, a number of times the text has been read, a number of times the words in the text have been occurring, used, read, and clicked, and a frequency of common words, and a correlation of external sites, a conversion of expert knowledge, a probability space, a Shannon entropy, a spatial distribution, or a combination thereof.

4. The method for extracting valuable words and forming a valuable word net as claimed in claim 1, wherein the first machine learning and the second machine learning employ an unsupervised learning, a self-supervised learning, a heuristic algorithms, or a combination thereof.

5. The method for extracting valuable words and forming a valuable word net as claimed in claim 1, wherein the word extraction module learns the text information in different languages, and extracts the same or similar valuable words in different languages.

6. The method for extracting valuable words and forming a valuable word net as claimed in claim 1, wherein the step of forming the valuable word net is followed by a step of extraction, a user extracts the valuable word from the server through a user information device, and the valuable word net linked based on the word weight and belonging to the valuable word is also extracted by the server.

7. A system for extracting valuable words and forming a valuable word net, comprising:
  a server comprising a data processing module which is respectively connected to a data storage module, a data collection module, a word extraction module, and a word net linking module, wherein the data processing module is employed to operate the server;
  wherein the data storage module comprises a learning database, a valuable word database, and a word net database;
  wherein the data collection module collects and stores a text information and a text-related information in the learning database;
  wherein the word extraction module makes use of the text information and the text-related information stored in the learning database as a first training data to perform a first machine learning, a valuable word is extracted from the text information based on a first machine learning result, and the valuable word is stored in the valuable word database;
  wherein the word net linking module uses the valuable word and the text-related information as a second training information and performs a second machine learning, the valuable word is linked to another valuable word or a plurality of the valuable words according to a word weight based on a second machine learning result, and then the word net linking module generates one or more groups of the valuable words linked based on the word weight into a valuable word net, and the valuable word net is stored to the word net database; and
  a third-party search system providing the text information and the text-related information to the server.

8. The system for extracting valuable words and forming a valuable word net as claimed in claim 7, wherein the text information comprises articles from internet sources, email marketing texts, product descriptions, public documents, short texts, or a combination thereof.

9. The method for extracting valuable words and forming a valuable word net as claimed in claim 7, wherein the text-related information comprises a number of times the text has been used, a number of times the text has been linked, a number of times the text has been cited, a number of times the text has been clicked, a number of times the text has been read, a number of times the words in the text have been occurring, used, read, and clicked, and a frequency of common words, and a correlation of external sites, a conversion of expert knowledge, a probability space, a Shannon entropy, a spatial distribution, and a combination thereof.

10. The system for extracting valuable words and forming a valuable word net as claimed in claim 7, wherein the first machine learning and the second machine learning employs an unsupervised learning, a self-supervised learning, a heuristic algorithms, and a combination thereof.

11. The system for extracting valuable words and forming a valuable word net as claimed in claim 7, wherein the data processing module is linked to a word segmentation auxiliary module which mainly performs a word segmentation action on the text information to assist the word extraction module to extract the valuable word.

12. The system for extracting valuable words and forming a valuable word net as claimed in claim 7, wherein the word net linking module comprises a self-copying learning function, when the valuable word is formed into the valuable word net, the self-copy function extracts the past valuable word net from the word net database, apply the past valuable word to the valuable word net that is newly formed, and quickly adjust the word weight of the second machine learning result to form another valuable word net.

\* \* \* \* \*